May 29, 1923.
R. E. HAIRE
METHOD FOR MAKING PLASTIC GYPSUM
Filed May 27, 1922
1,457,161
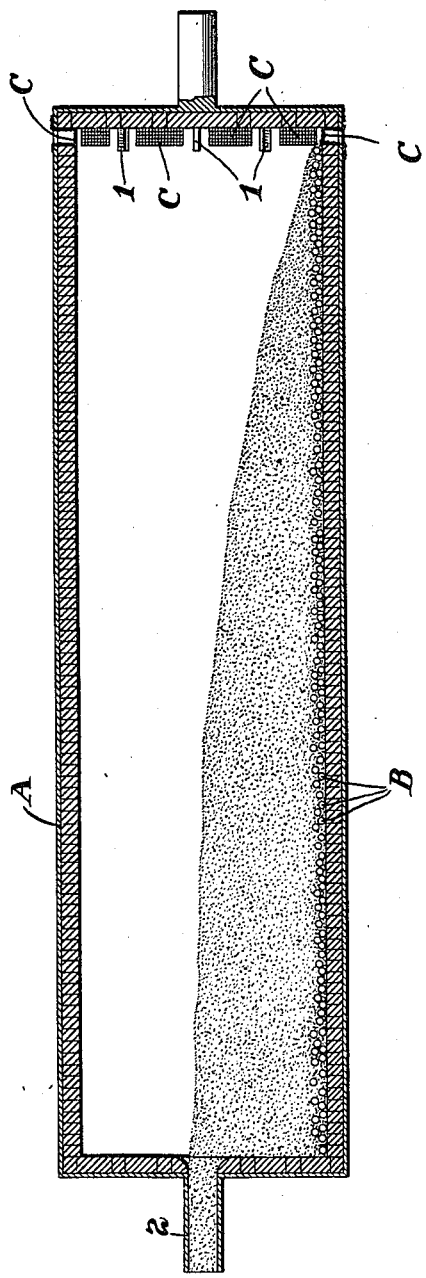
Inventor:
Robert E. Haire,
by Spear, Middleton, Donaldson & Hall
Attys.

Patented May 29, 1923.

1,457,161

UNITED STATES PATENT OFFICE.

ROBERT E. HAIRE, OF PARIS, ONTARIO, CANADA.

METHOD FOR MAKING PLASTIC GYPSUM.

Application filed May 27, 1922. Serial No. 564,248.

*To all whom it may concern:*

Be it known that I, ROBERT E. HAIRE, a citizen of Canada, and resident of Paris, Ontario, Canada, have invented certain new and useful Improvements in Methods for Making Plastic Gypsum, of which the following is a specification.

My invention relates to the production of plastic gypsum, such as that described in Letters Patent of the United States No. 1,392,574 granted to Warren E. Emley Oct. 4, 1921. In carrying out the process, I take calcined gypsum as it comes from the kettle after the first settle and pass this through a tube mill with exclusion of air, so that in the grinding operation the water content will not be allowed to evaporate. The calcined gypsum as it comes from the first settle in the calcining action contains about six per cent of moisture, and this moisture is retained in the material or in the tube mill wherein the grinding process is carried out.

The drawing, in the nature of a diagram, represents the tube mill.

The tube mill consists of a cylindrical body A, of about six feet in diameter and twenty-two feet long, and it contains a number of balls B, of about 1 and ¼" in diameter, amounting in weight to several tons. These balls have a grinding action on the material as the tube is rotated. The material is introduced into one end of the cylinder so that outside air will be excluded, and one method of introducing the material is by way of a screw feeder which keeps the inlet aperture filled with material and excludes atmospheric air.

The location of the discharge openings from the tube mill, I have found by experiment, is an important factor in the successful carrying out of the process, and for effecting this discharge the cylindrical body is provided with discharge openings C at its periphery.

Several tons of the material having been introduced into the cylinder and this rotated with exclusion of air, the material is ground with its water content and is discharged through the circumferential openings, and it is found that it will be sufficiently plastic as thus discharged for use as the white coat of plaster without further treatment. Plastic gypsum is also very much superior to the ordinary non-plastic gypsum or calcined plaster in making hardwall plaster, gypsum blocks, or for any other purpose where ordinary calcined plaster or plaster Paris is used.

The feeding in and the discharge goes on continuously.

The discharge openings C are screened as shown and in order to keep these openings clear the balls are raised by flanges 1 and roll over the screened openings to free the same from accumulations.

The degree of plasticity is regulated by the number of balls and the rate of feed of the material.

The peripheral discharge enables the process to be carried on without holding a large quantity of the material in the mill at one time, because the material will pass off as soon as the desired plasticity is reached, and there will be no clogging of the action, (due to a large mass) and this permits the desired degree of plasticity to be attained.

The hollow journal 2 serves as the feed inlet. As this is kept full, there will be no entrance of air here and consequently there will be no circulation of air through the interior of the mill, and the water content will not go off.

The material may be fed in either hot or cold.

Some heat will be generated in the grinding action and steam which goes off from the material will remain in the drum, there being no circulation therethrough as above stated.

I claim:

The herein described method of making plastic gypsum, consisting in passing calcined gypsum through a tube mill with substantial exclusion of air in circulation through said mill to thereby prevent loss of the water content during the grinding, the material being allowed to discharge at the periphery of the mill when the desired degree of plasticity is reached.

ROBERT E. HAIRE.